United States Patent
Ohlendorf

(10) Patent No.: US 11,779,179 B2
(45) Date of Patent: *Oct. 10, 2023

(54) FILTER CLEANING

(71) Applicant: Hilti Aktiengesellschaft, Schaan (LI)

(72) Inventor: Oliver Ohlendorf, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,756

(22) Filed: Jul. 5, 2022

(65) Prior Publication Data

US 2022/0330774 A1 Oct. 20, 2022

Related U.S. Application Data

(63) Continuation of application No. 16/624,391, filed as application No. PCT/EP2018/066327 on Jun. 20, 2018, now Pat. No. 11,457,787.

(30) Foreign Application Priority Data

Jun. 29, 2017 (EP) .................................... 17178621

(51) Int. Cl.
*B01D 46/04* (2006.01)
*A47L 9/20* (2006.01)
(Continued)

(52) U.S. Cl.
CPC .................... *A47L 9/20* (2013.01); *A47L 9/10* (2013.01); *B01D 46/04* (2013.01);
(Continued)

(58) Field of Classification Search
CPC ... A47L 9/20; A47L 9/10; A47L 9/127; A47L 9/22; B01D 46/04; B01D 46/4272;
(Continued)

(56) References Cited

U.S. PATENT DOCUMENTS 5,002,594 A  3/1991  Merritt
7,647,672 B2  1/2010  Nam et al.
(Continued)

FOREIGN PATENT DOCUMENTS

CN  101327108 A  12/2008
CN  101460084 A  6/2009
(Continued)

OTHER PUBLICATIONS

International Search Report of PCT/EP2018/066327, dated Sep. 14, 2018.

Primary Examiner — Dung H Bui
(74) Attorney, Agent, or Firm — Davidson, Davidson & Kappel, LLC

(57) ABSTRACT

A filter device for a vacuum cleaner having a turbine device for generating at least one first and one second main air flow through at least a portion of the vacuum cleaner having and a control unit. The filter device has a first chamber including a first filter element, a first outflow opening, a first inlet opening and a first pressure surge element dividing the first chamber into a first chamber first space and a first chamber second space and reversibly movable between a first pressure surge element first position and a first pressure surge element second position, and a second chamber including a second filter element, a second outflow opening, a second inlet opening and a second pressure surge element dividing the second chamber into a second chamber first space and a second chamber second space reversibly movable between a second pressure surge element first position and a second pressure surge element second position.

11 Claims, 17 Drawing Sheets

(51) Int. Cl.
  *A47L 9/10* (2006.01)
  *B01D 46/42* (2006.01)
  *B01D 46/71* (2022.01)
  *B01D 46/90* (2022.01)
  *B01D 46/24* (2006.01)
  *A47L 9/12* (2006.01)
  *B01D 46/52* (2006.01)
  *A47L 9/22* (2006.01)

(52) U.S. Cl.
  CPC ......... *B01D 46/4272* (2013.01); *B01D 46/71* (2022.01); *B01D 46/90* (2022.01); *A47L 9/127* (2013.01); *A47L 9/22* (2013.01); *B01D 46/2411* (2013.01); *B01D 46/521* (2013.01); *B01D 2279/55* (2013.01)

(58) Field of Classification Search
  CPC .... B01D 46/71; B01D 46/90; B01D 46/2411; B01D 46/521; B01D 2279/55
  See application file for complete search history.

(56) References Cited

U.S. PATENT DOCUMENTS

| | | | |
|---|---|---|---|
| 7,947,099 | B2 | 5/2011 | Valentini |
| 8,961,633 | B2 | 2/2015 | Kienzle et al. |
| 9,756,999 | B2 | 9/2017 | Vines |
| 11,297,990 | B2 * | 4/2022 | Liu ................... B01D 46/4272 |
| 2003/0041729 | A1 | 3/2003 | Finigan |
| 2009/0000485 | A1 | 1/2009 | Valentini |
| 2009/0106933 | A1 | 4/2009 | Bruntner |
| 2009/0183338 | A1 | 7/2009 | Van Raalte et al. |
| 2009/0205491 | A1 | 8/2009 | Eckstein et al. |
| 2009/0205499 | A1 | 8/2009 | Eckstein et al. |
| 2009/0260179 | A1 | 10/2009 | Walker |
| 2012/0090640 | A1 | 4/2012 | Rentschler et al. |
| 2013/0263406 | A1 | 10/2013 | Amisani et al. |
| 2019/0150683 | A1 | 5/2019 | Valentini |
| 2019/0350422 | A1 | 11/2019 | Liu et al. |

FOREIGN PATENT DOCUMENTS

| | | |
|---|---|---|
| CN | 201977711 U | 9/2011 |
| CN | 202802999 U | 3/2013 |
| CN | 203458340 U | 3/2014 |
| CN | 203898201 U | 10/2014 |
| CN | 106175595 A | 12/2016 |
| CN | 106725113 A | 5/2017 |
| DE | 10101219 A1 | 7/2002 |
| DE | 202007015242 U1 | 12/2007 |
| DE | 102010045979 | 3/2012 |
| EP | 2110062 A2 | 10/2009 |
| KR | 20070074274 A | 7/2007 |

* cited by examiner

FILTER CLEANING

This is a Continuation of U.S. patent application Ser. No. 16/624,391 filed on Dec. 19, 2019 which is a National Phase Application of PCT/EP2018/066327, filed on Jun. 20, 2018 and claims the benefit of European Patent Application EP 17178621.3 filed on Jun. 29, 2017. All of the above disclosures are hereby incorporated by reference herein.

The present invention relates to a filter device for a vacuum cleaner, including a turbine device, for generating at least one first and one second main air flow through at least a portion of the vacuum cleaner, and a control unit.

SUMMARY OF THE INVENTION

Vacuum cleaners are often used on construction sites to vacuum up dirt particles in the form of dust, borings or the like.

To collect the dirt, a negative pressure is generated inside the vacuum cleaner with the aid of a turbine. Via a hose, which is connected to the vacuum cleaner, the negative pressure is utilized to vacuum up dirt particles and transport them into a collection container of the vacuum cleaner. Commercially available vacuum cleaners are usually designed in such a way that the turbine, a filter, a collection container and the inlet opening for the suctioned dirt particles are situated successively or on a flow path. It is significant that the filter is positioned between the collection container or the inlet opening for the suctioned dirt particles and the negative pressure-generating turbine. Since the suctioned air enriched with dirt particles would flow through the turbine and would consequently soil or damage the turbine, the filter is used to clean the suctioned air, and thus, in particular, to protect the turbine.

A problem, however, arises in the process when the filter is no longer able to provide a sufficient filter function, and it is no longer possible to filter suctioned dirt particles out of the air flowing through the filter. This is, in particular, the case when the filter is increasingly soiled, i.e., filled with dirt particles, due to an extended use of the vacuum cleaner. To keep the filter functional, it must be cleaned intermittently and freed of the collected dirt particles. To clean the filter, however, the vacuum cleaner must be switched off, opened, and the filter taken out to remove the collected dirt particles. Such activities, however, interrupt the vacuuming process and are very time consuming.

According to the prior art, vacuum cleaners also already exist which include a device for cleaning the filter, without having to switch off and open the vacuum cleaner and take out the filter to remove the collected dirt particles. The disadvantage of such devices, however, is that the vacuuming process also has to be interrupted with these vacuum cleaners while the filter is being cleaned. This also prolongs the work with the vacuum cleaner.

It is thus an object of the present invention to solve the above-described problem, and to provide an improved filter device for a vacuum cleaner with which a vacuuming process is not interrupted while the filter is being cleaned, and which therefore constitutes a time savings for the user of the vacuum cleaner.

The present invention provides a filter device for a vacuum cleaner having a turbine device for generating at least one first and one second main air flow through at least a portion of the vacuum cleaner having and a control unit, the filter device comprising:

a first chamber including a first filter element, a first outflow opening, a first inlet opening and a first pressure surge element dividing the first chamber into a first chamber first space and a first chamber second space and reversibly movable between a first pressure surge element first position and a first pressure surge element second position;

a second chamber including a second filter element, a second outflow opening, a second inlet opening and a second pressure surge element dividing the second chamber into a second chamber first space and a second chamber second space reversibly movable between a second pressure surge element first position and a second pressure surge element second position.

In this way, the vacuum process is not interrupted while the filter is being cleaned, and the user is able to continue to vacuum dirt particles with the aid of the vacuum cleaner.

According to one advantageous specific embodiment of the present invention, it may be possible that the alternating reversible movement of the first and second pressure surge elements from the first into the second position is regulated by the control unit. In this way, the number or frequency of the intervals for cleaning the filters may be precisely controlled.

According to one further alternative specific embodiment, a sensor may be present for measuring the air flow in the first space of the first and/or second chamber(s), with the aid of which the degree of soiling of the respective filter may be ascertained. The sensor is connected to the control unit and transmits a corresponding signal with respect to the degree of soiling of the respective filter to the control unit. The control unit furthermore includes a logic unit and/or a look-up table, with the aid of which the degree of soiling of the respective filter may be interpreted and, if necessary, immediate cleaning of the respective filter may be generated.

According to one further advantageous specific embodiment of the present invention, it may be possible that a first inlet line including a first valve and a second inlet line including a second valve are present, the first inlet opening being connectable to the ambient air by the first inlet line, and the second inlet opening being connectable to the ambient air by the second inlet line, and the first inlet line being closeable by the first valve and the second inlet line being closeable by the second valve. In this way, a connection may be created in a simple manner from the respective second space of the first or second chamber to the bypass air of the vacuum cleaner, and thus a connection to an atmospheric pressure condition.

It is possible for the first and/or second valve(s) to be connected to the control unit, so that the control unit is able to control or regulate the first and/or second valve(s) or the flow-through opening of the first and/or second valve(s). In this way, the first and/or second valve(s) may be controlled centrally via the control unit and individually.

According to one further advantageous specific embodiment of the present invention, it may be possible that a first and a second retaining element are present, the first retaining element being able to hold the first pressure surge element in the first position, and the second retaining element being able to hold the second pressure surge element in the first position. It is possible that the first retaining element is positioned in the second space of the first chamber, and that the second retaining element is positioned in the second space of the second chamber.

A retaining force for the respective pressure surge element is generated by the retaining element, so that a higher air pressure may be built up by the respective inlet line in the respective second space of the first or second chamber, before the pressure surge element is moved from the first position into the second position. Corresponding to the selected retaining force of the retaining element, it is also possible to increase the pulse generated by the pressure surge element which acts on the respective filter element for cleaning. As a result of a boosted pulse, the cleaning is also improved.

According to one further advantageous specific embodiment of the present invention, it may be possible that the first and/or second retaining element(s) is/are designed in the form of a spring. In this way, the retaining element may be implemented in a simple manner. The spring may be designed in the form of a compression spring, which is positioned in the first space and pushes the pressure surge element in one direction. Furthermore, the spring may also be designed in the form of a tension spring, which is positioned in the second space and pulls the pressure surge element in one direction.

According to one further advantageous specific embodiment of the present invention, it may be possible that the first and/or second retaining element(s) is/are designed in the form of a magnet. In this way, an almost maximal pressure may be generated in the second space in a simple manner before the respective pressure surge element is instantaneously moved from the first into the second position. A pulse generated by the pressure surge element for cleaning the filter element is thus almost maximal.

According to one further advantageous specific embodiment of the present invention, it may be possible for a first and a second connecting channel to be present, the first connecting channel connecting the turbine device and the first feed line to increase the air pressure in the second space of the first chamber with the aid of the turbine device, and the second connecting channel connecting the turbine device and the second feed line to increase the air pressure in the second space of the second chamber with the aid of the turbine device. In this way, a negative pressure may be generated in the respective second space with the aid of the turbine device to move the pressure surge element more quickly again from the second position into the first position.

According to one further advantageous specific embodiment, the connecting channels may be controlled or regulated via a valve. The control or regulation is carried out by the control unit.

Furthermore, a first pressure sensor, connected to the control unit, may be present in the second space of the first chamber, and a second sensor, connected to the control unit, may be present in the second space of the second chamber, by which the air pressure in the respective second space is measurable. In this way, the value of the air pressure in the respective second space is routed to the control unit, so that the control unit opens, or further opens, the first and/or second valve(s) to increase the air pressure. As an alternative, the control unit may thus have an air pressure flow from the turbine device via the first and/or second connecting channel(s) into the respective second space. The control unit is connected to the turbine device for this purpose.

BRIEF DESCRIPTION OF THE DRAWINGS

Further advantages are derived from the following description of the figures. The figures show different exemplary embodiments of the present invention. The figures, the description and the claims include numerous features in combination. Those skilled in the art will advantageously also consider the features individually and combine them into useful further combinations.

In the figures, identical and similar components are denoted by identical reference numerals.

DETAILED DESCRIPTION OF THE EMBODIMENTS

Figure 1:
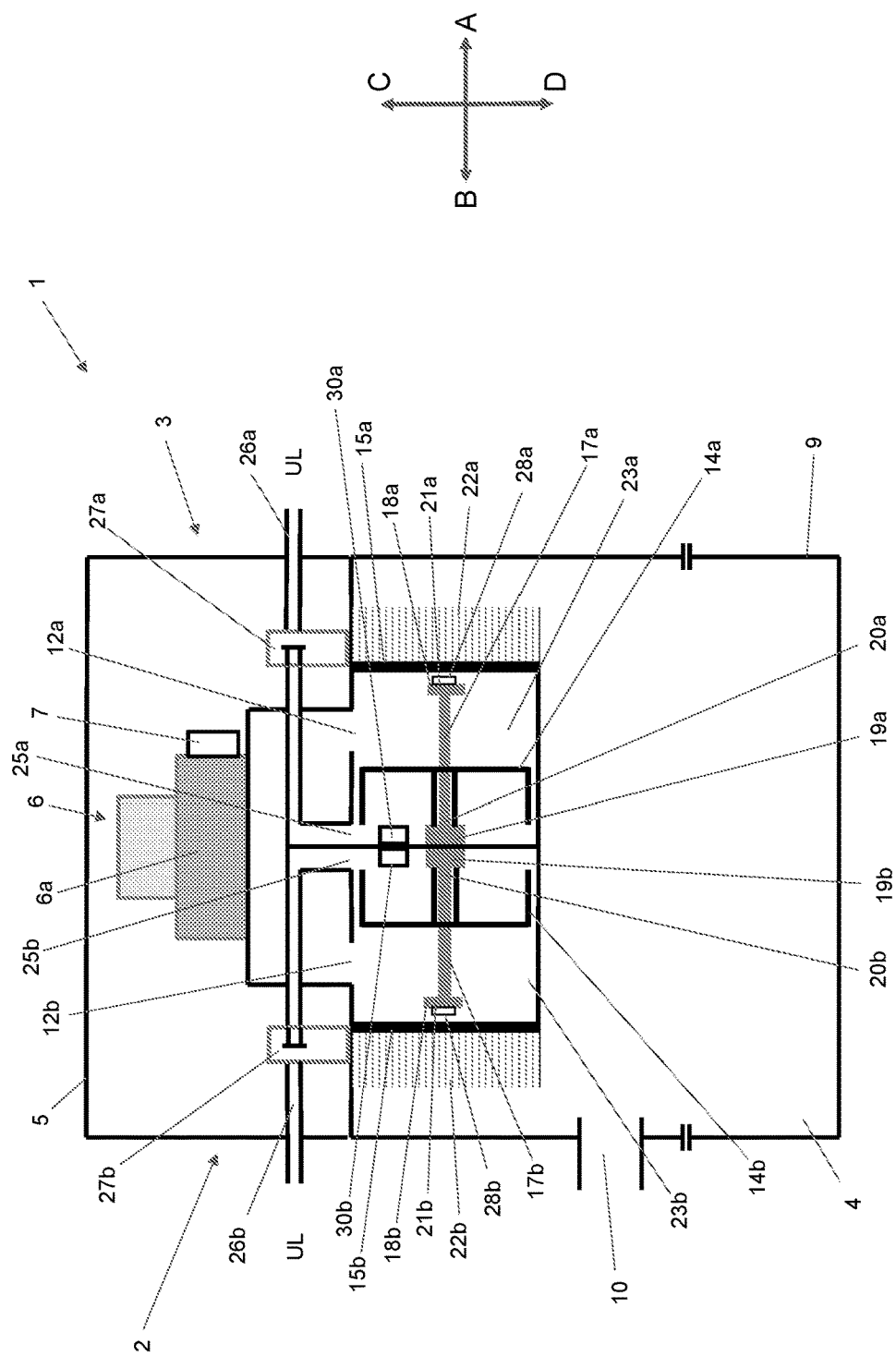
FIG. 1 shows a schematic side view of a vacuum cleaner including a filter device according to the present invention, according to a first specific embodiment.

FIGS. 1 through 12 show a vacuum cleaner 1 including a filter device 2 according to the present invention, according to a first specific embodiment.

Vacuum cleaner 1 essentially includes a suction head 3 and a collection container 4 for dirt particles. Suction head 3, in turn, essentially includes a housing 5, a turbine device 6, filter device 2, and a control unit 7.

Turbine device 6 is used to generate a first main air flow 8a and a second main air flow 8b. Both first and second main air flows 8a, 8b flow from collection container 4 to suction head 3 through turbine device 6 and out of housing 5 (cf. FIG. 2).

Control unit 7 is positioned on a housing 6a of turbine device 6. However, it is also possible for control unit 7 to be positioned in any other possible location of suction head 3. Moreover, control unit 7 is connected to turbine device 6 in such a way that the function of turbine device 6 may be controlled and regulated by control unit 7.

Collection container 4 is essentially made up of a pan 9 having a suction opening 10. As an alternative, collection container 4 may also be designed without a suction opening, so that the suctioned air including dirt particles SP may flow into suction head 3 via an opening provided for this purpose, and into collection container 4 via a corresponding line. With such an embodiment, a disposal bag without a corresponding hole for a suction opening may be inserted into collection container 4.

A first end of a vacuum cleaner hose may be connected to suction opening 10. The second end of the vacuum cleaner hose includes an interface for a nozzle (e.g., a floor nozzle) or a suction device on a machine tool, with which dirt particles may be vacuumed up. With the aid of first and second main air flows 8a, 8b, air and thus dirt particles SP are suctioned through the vacuum cleaner hose and transported into collection container 4. The vacuum cleaner hose is not shown in the figures.

Filter device 2 includes a first chamber 11a and a second chamber 11b. Both first and second chambers 11a, 11b have a cylindrical shape. However, it is also possible for first chamber 11a and/or second chamber 11b to each have a different shape.

First chamber 11a essentially has a first outflow opening 12a, a first inlet opening 25a, a first pressure surge element 14a, and a first inflow opening 15a. Second chamber 11b has a second outflow opening 12b, a second inlet opening 25b, a second pressure surge element 14b, and a second inflow opening 15b.

Both first and second pressure surge elements 14a, 14b are essentially implemented in the form of a piston having a circular diameter and a central recess 16a, 16b. As an alternative, the cross section may also have any other possible shape. Each pressure surge element 14a, 14b is movable in the respective first or second chamber 11a, 11b between a first and a second position. Chamber 11a, 11b serves as a kind of cylinder in the process, so that pressure surge element 14a, 14b in the respective chamber 11a, 11b form a piston-cylinder unit.

First and second chambers 11a, 11b moreover each include a guide rod 17a, 17b, a first stop element 18a, 18b, and a second stop element 19a, 19b. Each guide rod 17a, 17b has a respective first end 20a, 20b and a second end 21a, 21b. First stop element 18a, 18b is positioned on first end 20a, 20b of guide rod 17a, 17b, and second stop element 19a, 19b is positioned on second end 21a, 21b of guide rod 17a, 17b. Pressure surge element 14a, 14b designed as a piston is positioned with central recess 16a, 16b around guide rod 17a, 17b, or guide rod 17a, 17b extends through central recess 16a, 16b. Pressure surge element 14a, 14b is thus able to move between first end 20a, 20b of guide rod 17a, 17b including first stop element 18a, 18b and second end 21a, 21b of guide rod 17a, 17b including second stop element 19a, 19b. Stop elements 18a, 18b, 19a, 19b are made up of rubber (or another elastic or compressible material) and damp the movement of pressure surge element 14a, 14b when it is situated either on first or second end 20a, 20b, 21a, 21b of guide rod 17a, 17b. When pressure surge element 14a, 14b rests against first end 20a, 20b of guide rod 17a, 17b, pressure surge element 14a, 14b is in the first position. Accordingly, pressure surge element 14a, 14b is in the second position when pressure surge element 14a, 14b rests against second end 21a, 21b of guide rod 17a, 17b.

First inflow opening 15a is situated in direction A on first chamber 11a and is used to releasably accommodate a first filter element 22a. First main air flow 8a flows through first filter element 22a and first inflow opening 15a from collection container 4 into first chamber 11a. First filter element 22a is used to filter the suctioned dirt particles SP out of first main air flow 8a. Dirt particles SP remain in the individual fibers of first filter element 22a. First main air flow 8a flows back out of first chamber 11a through first outflow opening 12a and to turbine device 6.

Figure 5:
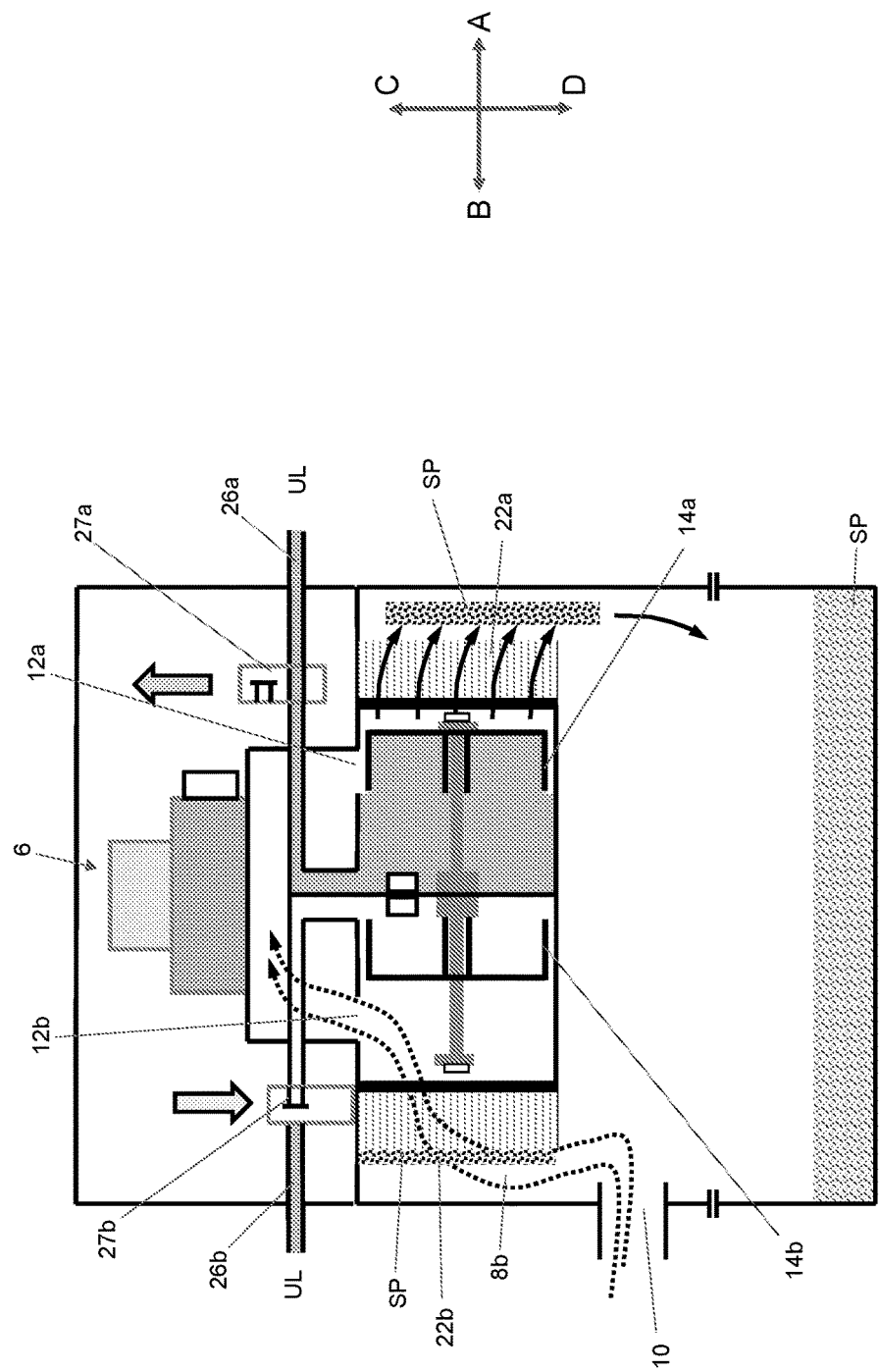
FIG. 5 shows a further schematic side view of the vacuum cleaner including the filter device according to the present invention, according to the first specific embodiment, the first pressure surge element being in the second position so that the first filter element is being cleaned.
Figure 6:
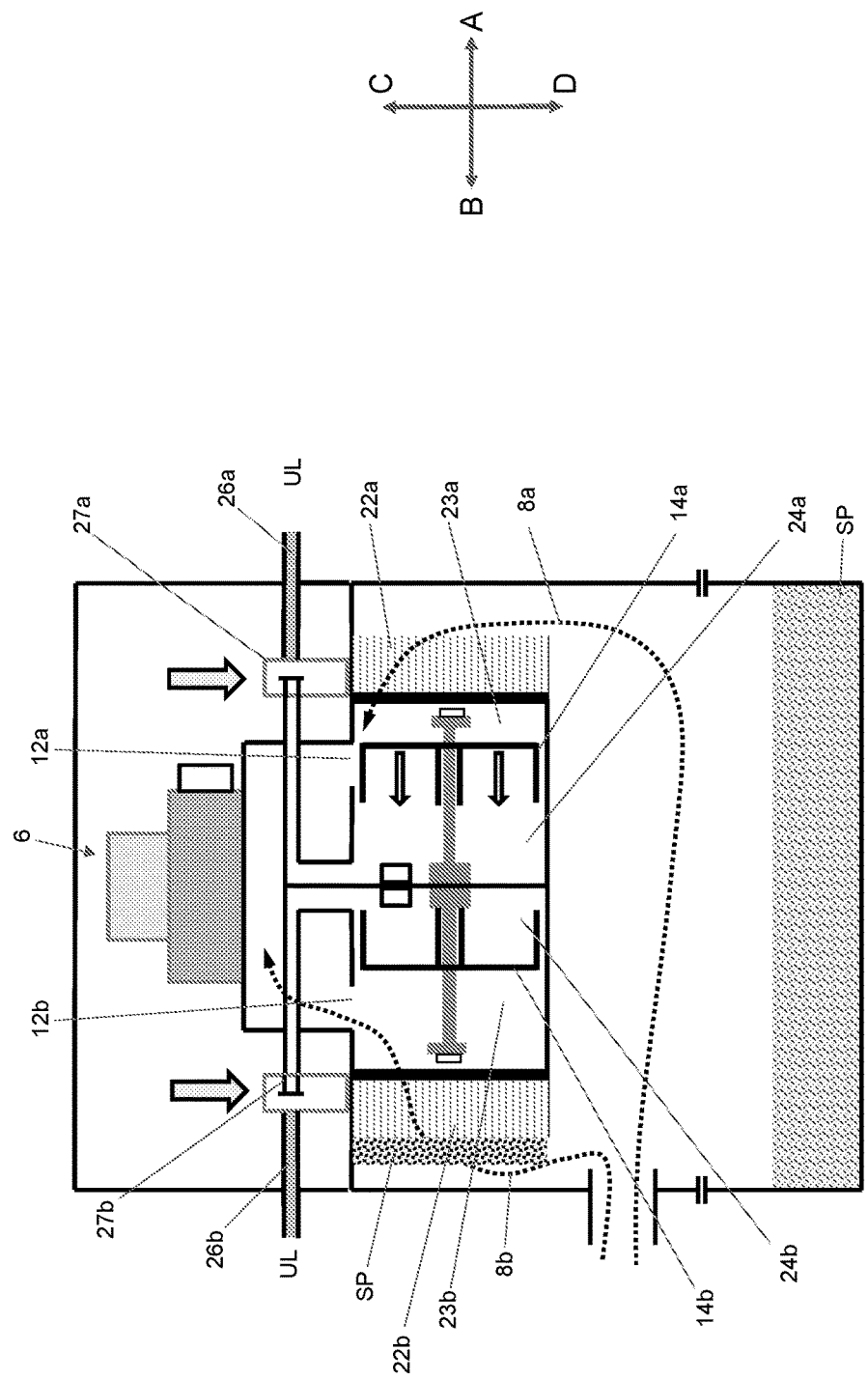
FIG. 6 shows a further schematic side view of the vacuum cleaner including the filter device according to the present invention, according to the first specific embodiment, the first and second valves being closed, and the first pressure surge element moving from the second into the first position.
Figure 9:
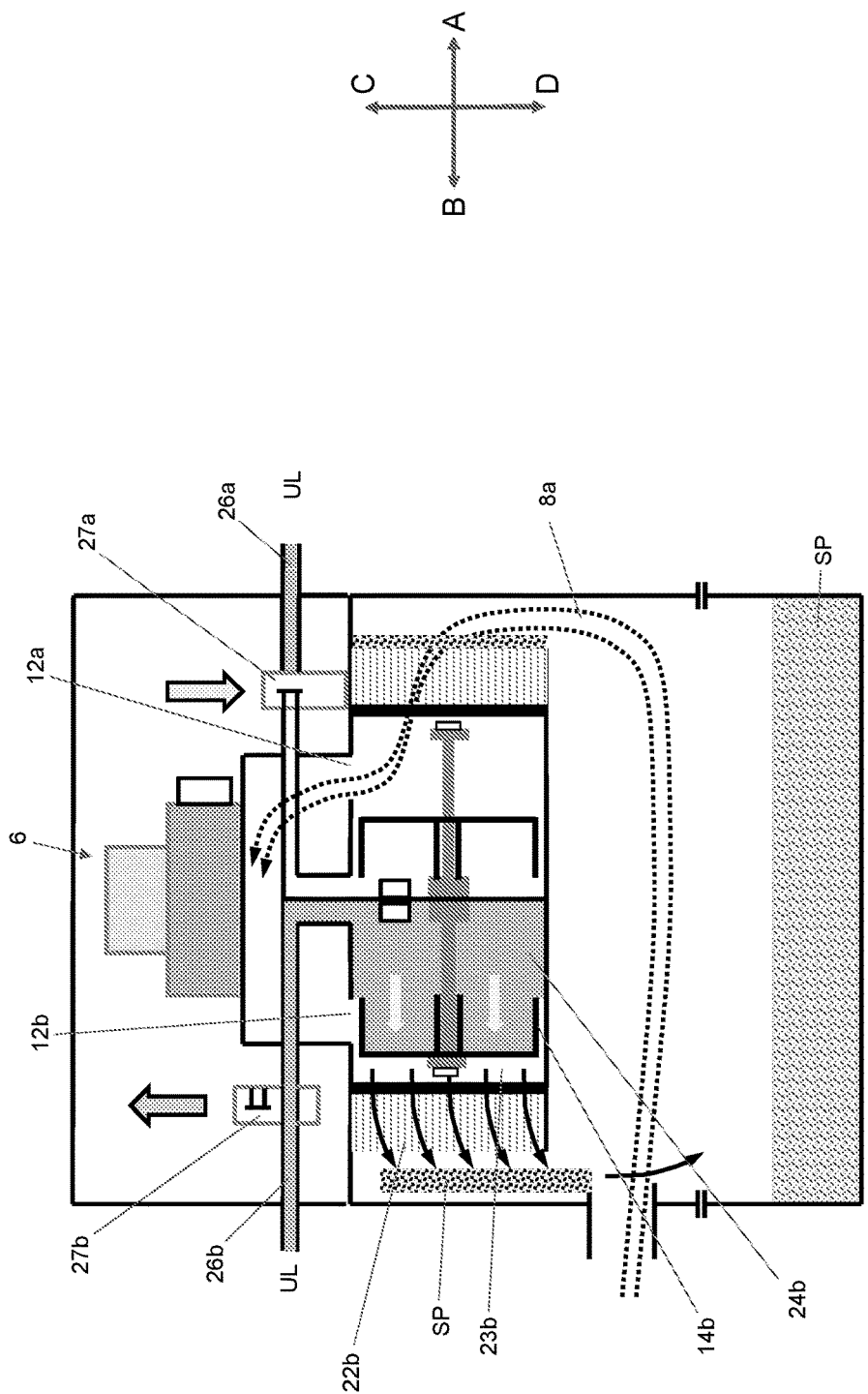
FIG. 9 shows a further schematic side view of the vacuum cleaner including the filter device according to the present invention, according to the first specific embodiment, the second pressure surge element being in the second position so that the second filter element is being cleaned.
Figure 10:
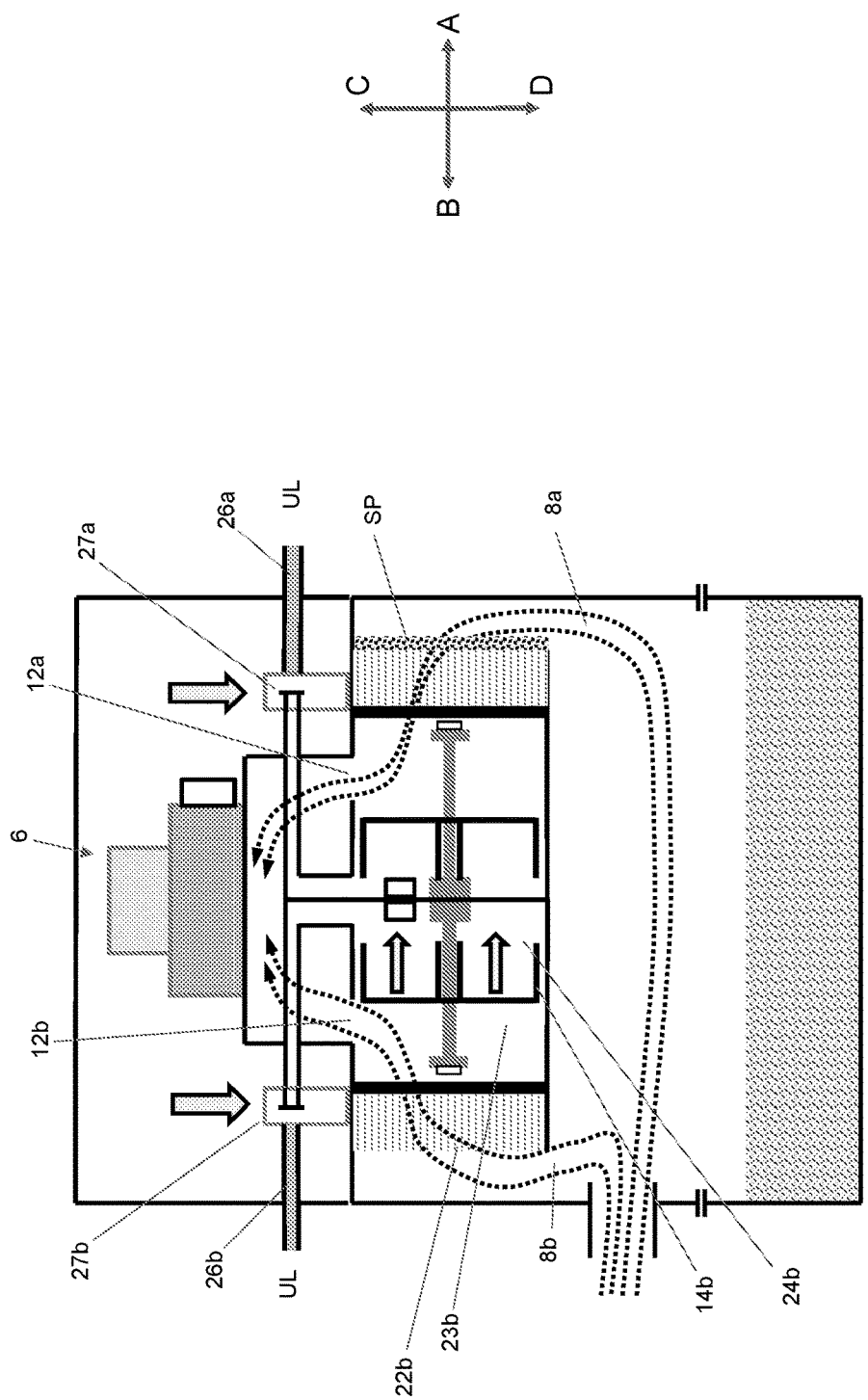
FIG. 10 shows a further schematic side view of the vacuum cleaner including the filter device according to the present invention, according to the first specific embodiment, the first and second valves being closed, and the second pressure surge element moving from the second into the first position.
Figure 11:
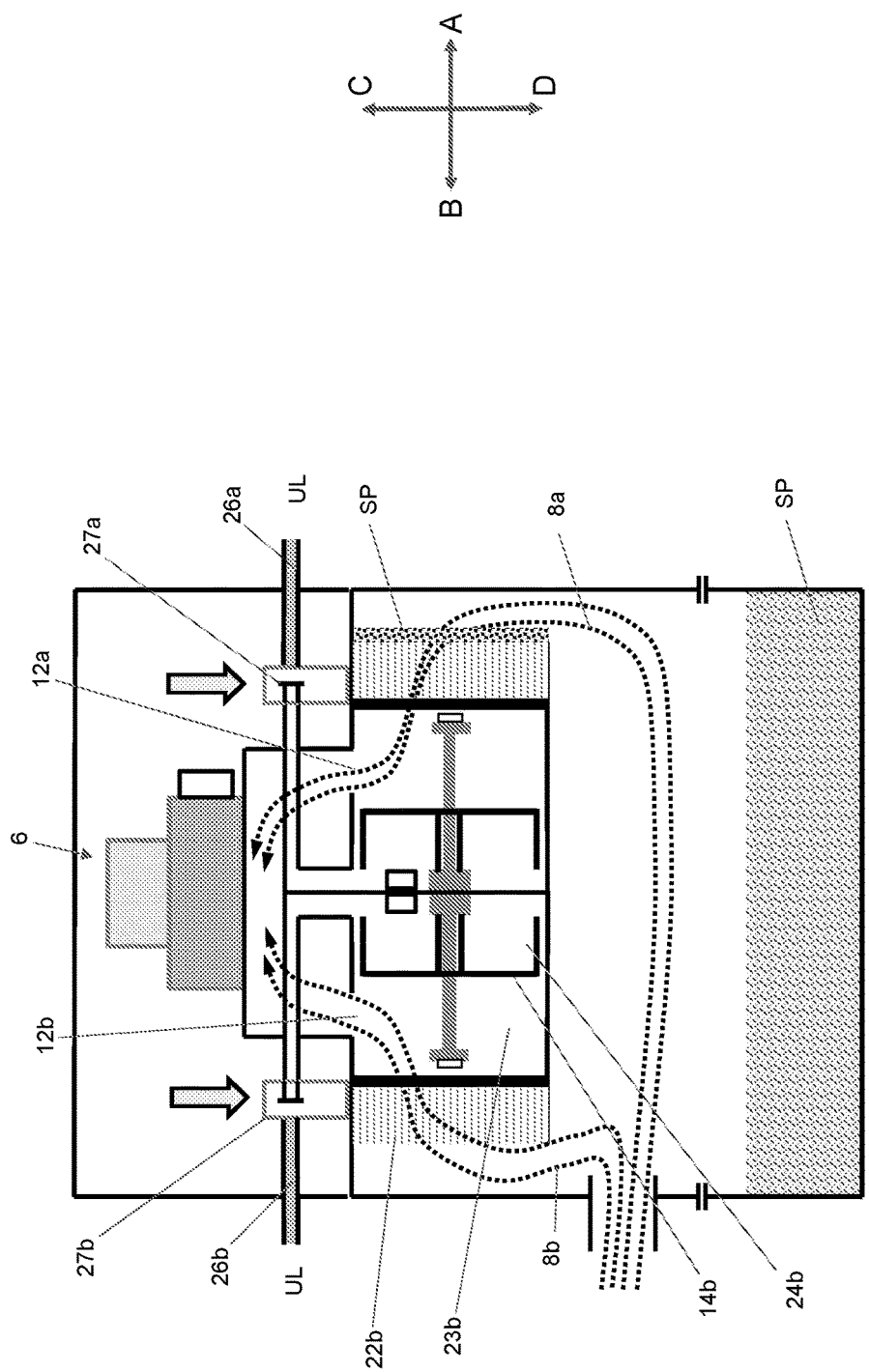
FIG. 11 shows a further schematic side view of the vacuum cleaner including the filter device according to the present invention, according to the first specific embodiment, the first and second valves being closed, and both the first and the second pressure surge element being in the first position.
Figure 12:
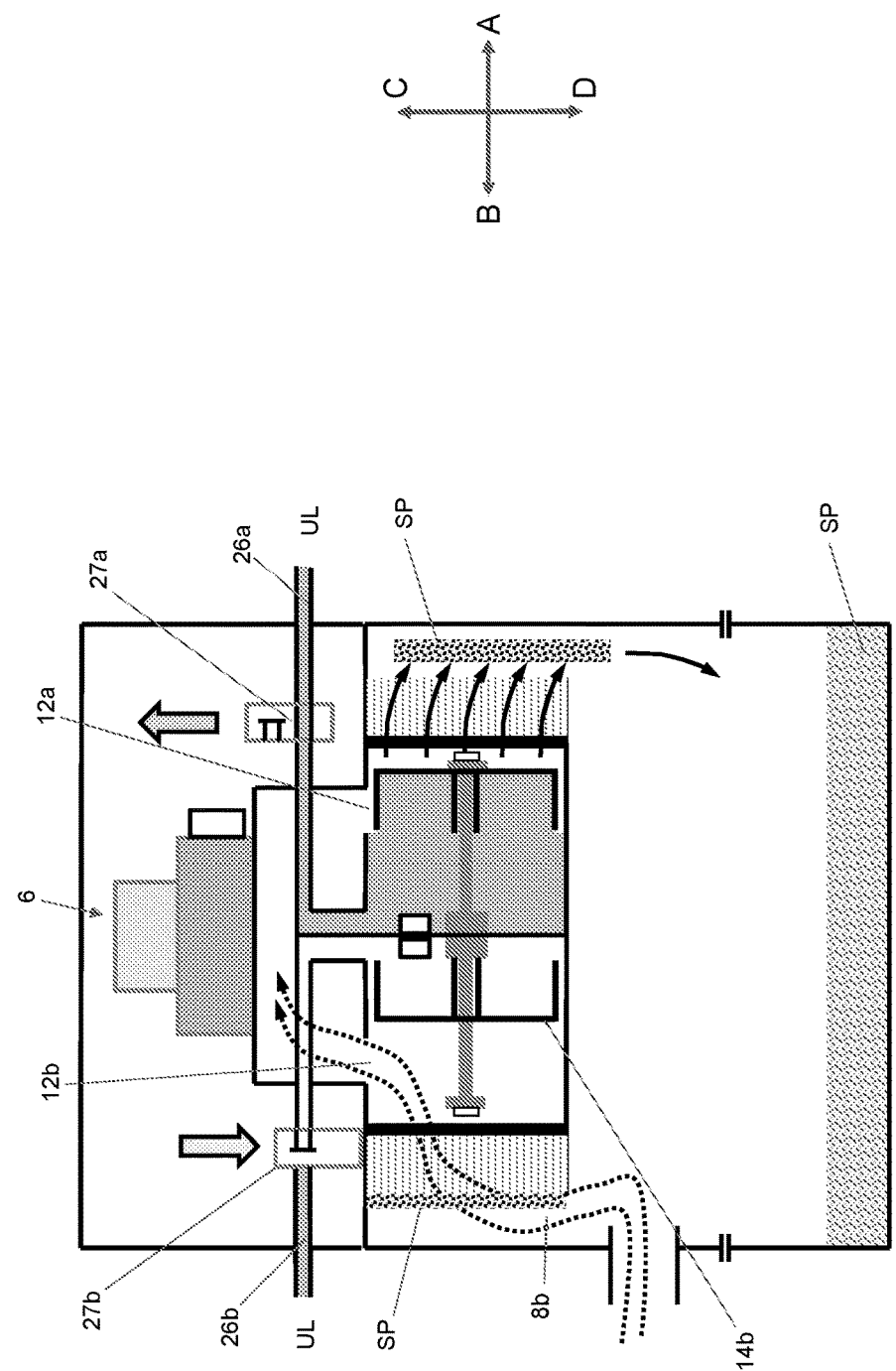
FIG. 12 shows a further schematic side view of the vacuum cleaner including the filter device according to the present invention, according to the first specific embodiment, the first pressure surge element being in the second position so that the first filter element is being cleaned.

It should be noted that first outflow opening 12a is closed by first pressure surge element 14a when first pressure surge element 14a is in the second position (cf. FIGS. 5, 9, 12).

As was already mentioned above, first pressure surge element 14a is positioned inside first chamber 11a and may be reversibly moved between a first and a second position. First pressure surge element 14a thus divides first chamber 11a into a first space 23a and a second space 24a. By displacing first pressure surge element 14a in first chamber 11a, the volumes of first and second spaces 23a, 24a are variable. First main air flow 8a flows primarily through first space 23a of first chamber 11a.

First inlet opening 25a is situated on second space 24a of first chamber 11a. A first inlet line 26a including a first valve 27a is connected to first inlet opening 25a. Air from surroundings UL of the vacuum cleaner having an atmospheric pressure may reach second space 24a of first chamber 11a via first inlet line 26a. Control unit 7 is connected to first valve 27a in such a way that control unit 7 is able to control and regulate the function of first valve 27a. Control unit 7 may, in particular, control the opening and closing of first valve 27a to regulate the inward flow of ambient air UL: with atmospheric pressure into the second space. The connection between control unit 7 and first valve 27a is not shown in the figures.

Second inflow opening 15b is situated in direction B on second chamber 11b and is used to releasably accommodate second filter element 22b. Second main air flow 8b flows through second filter element 22b and second inflow opening 15b from collection container 4 into second chamber 11b. Second filter element 22b is used to filter the suctioned dirt particles SP out of second main air flow 8b. Dirt particles SP remain in the individual fibers of second filter element 22b. Second main air flow 8b flows back out of second chamber 11b through second outflow opening 12b and to turbine device 6.

As was also already mentioned above, second pressure surge element 14b is positioned inside second chamber 11b and may be reversibly moved between a first and a second position. Second pressure surge element 14b divides second chamber 11b into a first space 23b and a second space 24b. By displacing second pressure surge element 14b in second chamber 11b, the volumes of first and second spaces 23b, 24b are variable. Second main air flow 8b flows primarily through first space 23b of second chamber 11b. Second inlet opening 25b is situated on second space 24b of second chamber 11b. A second inlet line 26b including a second valve 27b is connected to second inlet opening 25b. Air from surroundings UL of vacuum cleaner 1 having an atmospheric pressure may reach second space 24b of second chamber 11b via second inlet line 26b. Control unit 7 is connected to second valve 27b in such a way that control unit 7 is able to control and regulate the function of second valve 27b. Control unit 7 may, in particular, control the opening and closing of second valve 27b to regulate the inward flow of ambient air UL with atmospheric pressure into second space 24b. The connection between control unit 7 and second valve 27b is not shown in the figures.

Moreover, first space 23a, 23b of first and second chambers 11a, 11b includes a respective first air pressure sensor 28a, 28b, which measures the air pressure in first space 23a, 23b and is connected to control unit 7. Via the connection, first air pressure sensor 28a, 28b is able to transmit the air pressure value in first space 23a, 23b to control unit 7. First air pressure sensor 28a, 28b is positioned in first space 23a, 23b and, in particular, in each case on second end 21a, 21b of guide rod 17a, 17b. The processing unit and the memory of control unit 7 also contain highlighted data (look-up table), with the aid of which air pressure values in first space 23a, 23b transmitted by first air pressure sensors 28a, 28b may be processed.

As is described in detail hereafter, the values of first air pressure sensors 23a, 23b are used to establish whether and to what degree first and/or second filter element 22a, 22b is filled with suctioned dirt particles SP. The lower the air pressure value measured by first air pressure sensor 28a, 28b, the less air is able to penetrate into chambers 11a, 11b, and the fuller is filter element 22a, 22b with dirt particles SP.

Furthermore, second space 24a, 24b of first and second chambers 11a, 11b includes a respective second air pressure sensor 30a, 30b, which measures the air pressure in second space 24a, 24b and is connected to control unit 7. Via the connection, second air pressure sensor 30a, 30b is able to transmit the air pressure value in second space 24a, 24b to control unit 7. Second air pressure sensor 30a, 30b is positioned in the respective second space 24a, 24b and on a partition 31 extending between first and second chambers 11a, 11b. The processing unit and the memory of control unit 7 also include underlying data (look-up table), with the aid of which air pressure values in second space 24a, 24b transmitted by second air pressure sensors 30a, 30b may be processed.

Figure 2:
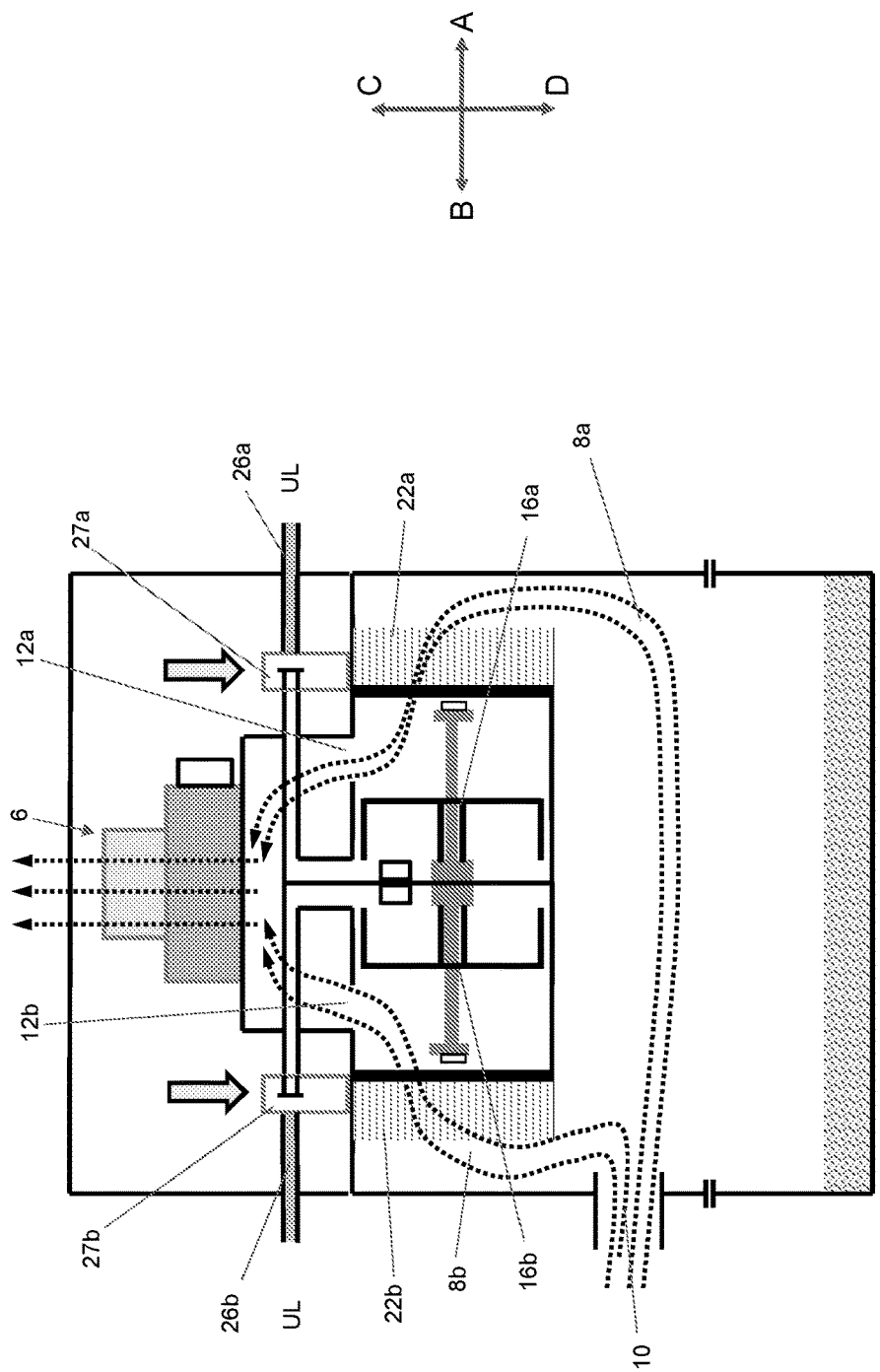
FIG. 2 shows a further schematic side view of the vacuum cleaner including the filter device according to the present invention, according to the first specific embodiment, a first and a second pressure surge element being in a first position, and a first and a second valve being closed.

When vacuum cleaner 1 is in a normal suction state, in which air is suctioned with the aid of two main air flows 8a, 8b through the vacuum cleaner hose (not shown) and two filter elements 22a, 22b, first pressure surge element 14a in first chamber 11a is in the first position (cf. FIGS. 1 and 2). Dirt particles SP suctioned by main air flows 8a, 8b remain adhering in the fibers of filter elements 22a, 22b (cf. FIG. 3). As is apparent from FIGS. 1 and 2, first and second valves 27a, 27b are connected to the respective inlet lines 26a, 26b, through which no ambient air UL with an atmospheric pressure is able to reach second space 24a, 24b of first or second chamber 11a, 11b.

Figure 3:
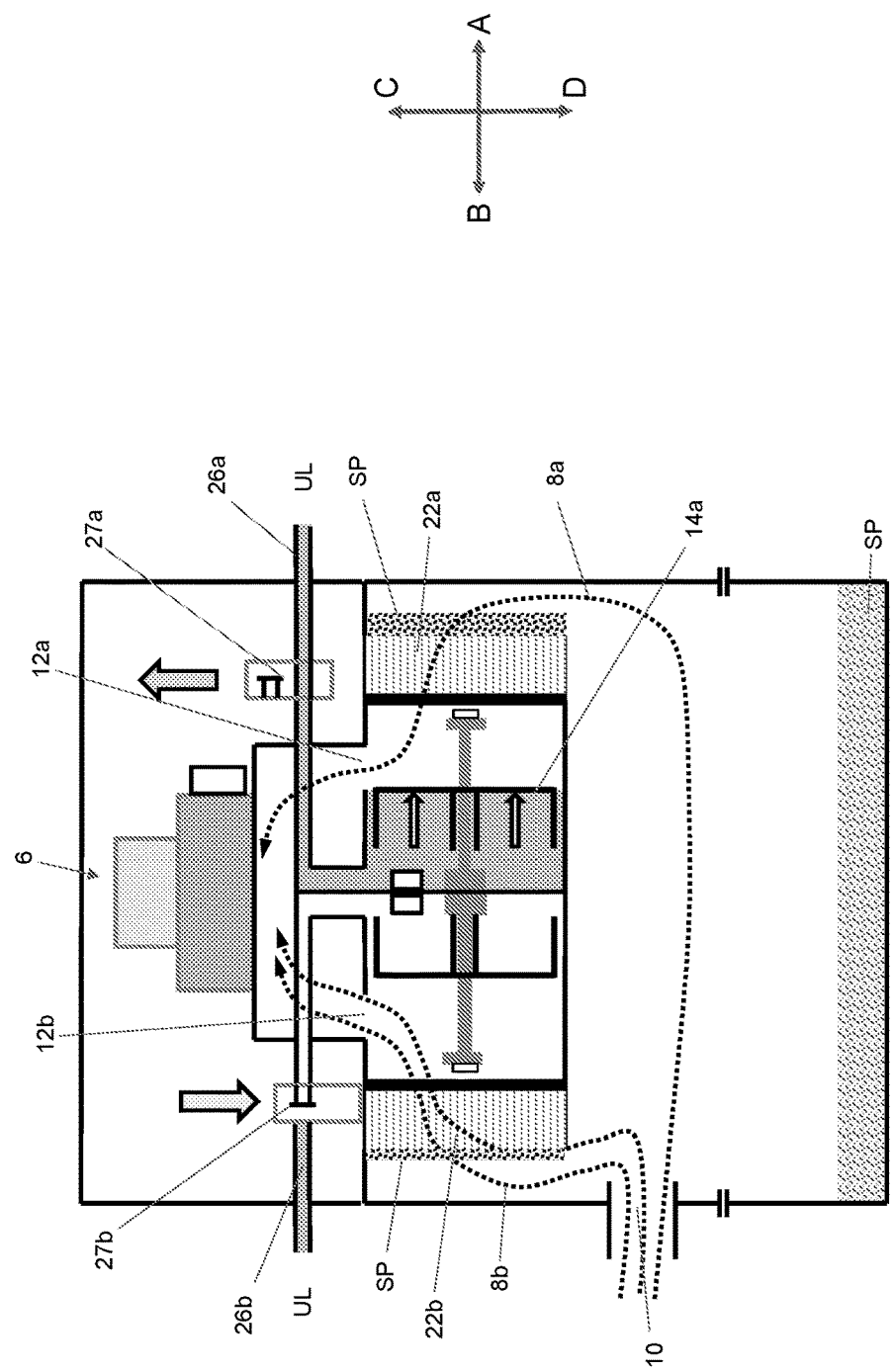
FIG. 3 shows a further schematic side view of the vacuum cleaner including the filter device according to the present invention, according to the first specific embodiment, the first and second pressure surge elements being in the first position, and the first valve being open and the second valve being closed.

As is indicated in FIG. 3, a certain layer made up of suctioned dirt particles SP is formed on first filter element 22a. Dirt particle layer SP on first filter element 22a is thicker than on second filter element 22b. As a result of the relatively thick dirt particle layer SP on first filter element 22a, less suctioned air reaches first space 23a of first chamber 11a with first main air flow 8a. First air pressure sensor 28a in first space 23a of first chamber 11a measures the low air pressure value and transmits it to control unit 7. Control unit 7 evaluates the low air pressure value and opens first valve 28a in first inlet line 26a. The evaluation is carried out by a comparison of the detected air pressure values to stored values. As an alternative, the evaluation may take place by a stored logarithm. As a result of the opening of first valve 28a, ambient air UL having an atmospheric pressure, i.e., having an air pressure value which is higher than the instantaneous air pressure value in first space 23a of first chamber 11a, is able to flow through first inlet line 26a and through first inlet opening 25a into second space 24a of first chamber 11a. Second air pressure sensor 30a in second space 24a measures the air pressure in second space 24a, which increases due to inflowing ambient air UL. By transmitting the value of second air pressure sensor 30a to control unit 7, control unit 7 is able to monitor the rising air pressure in second space 24a and set valve 27a accordingly. If, for example, the air pressure in second space 24a very quickly exceeds a particular value stored in the memory of control unit 7, control unit 7 closes valve 27a accordingly quickly again. Likewise, valve 27a may also remain open longer when the air pressure in second space 24a increases only slowly. Similarly, control unit 7 may also regulate the flow diameter in valve 27a to allow either more or less ambient air UL to flow into second space 24a more quickly or more slowly.

Figure 4:
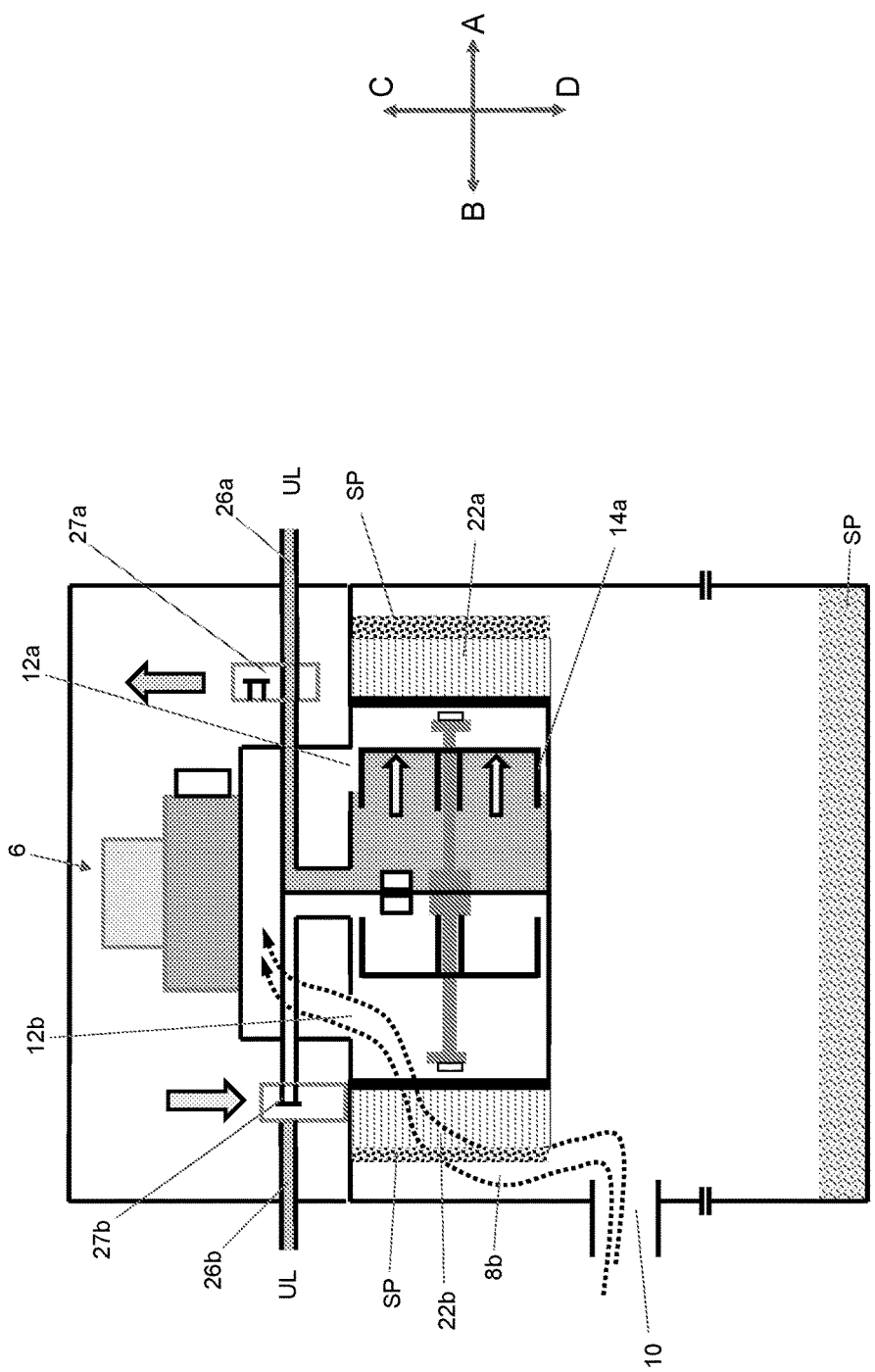
FIG. 4 shows a further schematic side view of the vacuum cleaner including the filter device according to the present invention, according to the first specific embodiment, the first pressure surge element being between the first and second positions.

Since a higher pressure is now present in second space 24a than in first space 23a, first pressure surge element 14a is moved from the first position in direction A into second position (cf. FIG. 4). This movement takes place instantaneously, so that a pulse is transmitted from first pressure surge element 14a to first filter element 22a via the accumulated air in the gap (i.e., small first space) between first pressure surge element 14a and first filter element 22a. As a result of this pulse, dirt particle layer SP is detached from or knocked off first filter element 22a. Dirt particle layer SP falls in direction D into collection container 4 (cf. FIG. 5). In this state, vacuum cleaner 1 continues to remain in a vacuuming mode since it is possible to continue to suction dirt particles SP through second filter element 22b and second chamber 11b with second main air flow 8b (cf. FIGS. 4, 5).

It shall be noted that first pressure surge element 14a, 14b is not moved completely toward filter element 22a, 22b until contact is made. As was already mentioned, a certain gap remains between pressure surge element 14a, 14b and filter element 22a, 22b. As was already mentioned above, first outflow opening 12a is closed by pressure surge element 14a designed as a piston when first pressure surge element 14a is in the second position (FIG. 5).

After dirt particle layer SP has fallen off first filter element 22a into collection container 4, first valve 27a is closed again, so that ambient air UL with an atmospheric air pressure is no longer able to reach second space 24a. Since overpressure as a result of the introduced ambient air UL is no longer present in second space 24a of first chamber 11a, and first main air flow 8a again pushes on first pressure surge element 14a with a higher air pressure, first pressure surge element 14a moves from the second position in direction B back into the first position again. First outflow opening 12a is no longer closed by first pressure surge element 14a and opens increasingly when first pressure surge element 14a moves in direction B. With the increasing opening of first outflow opening 12a, increasingly more air flows with first main air flow 8a through first space 23a of first chamber 11a.

Figure 7:
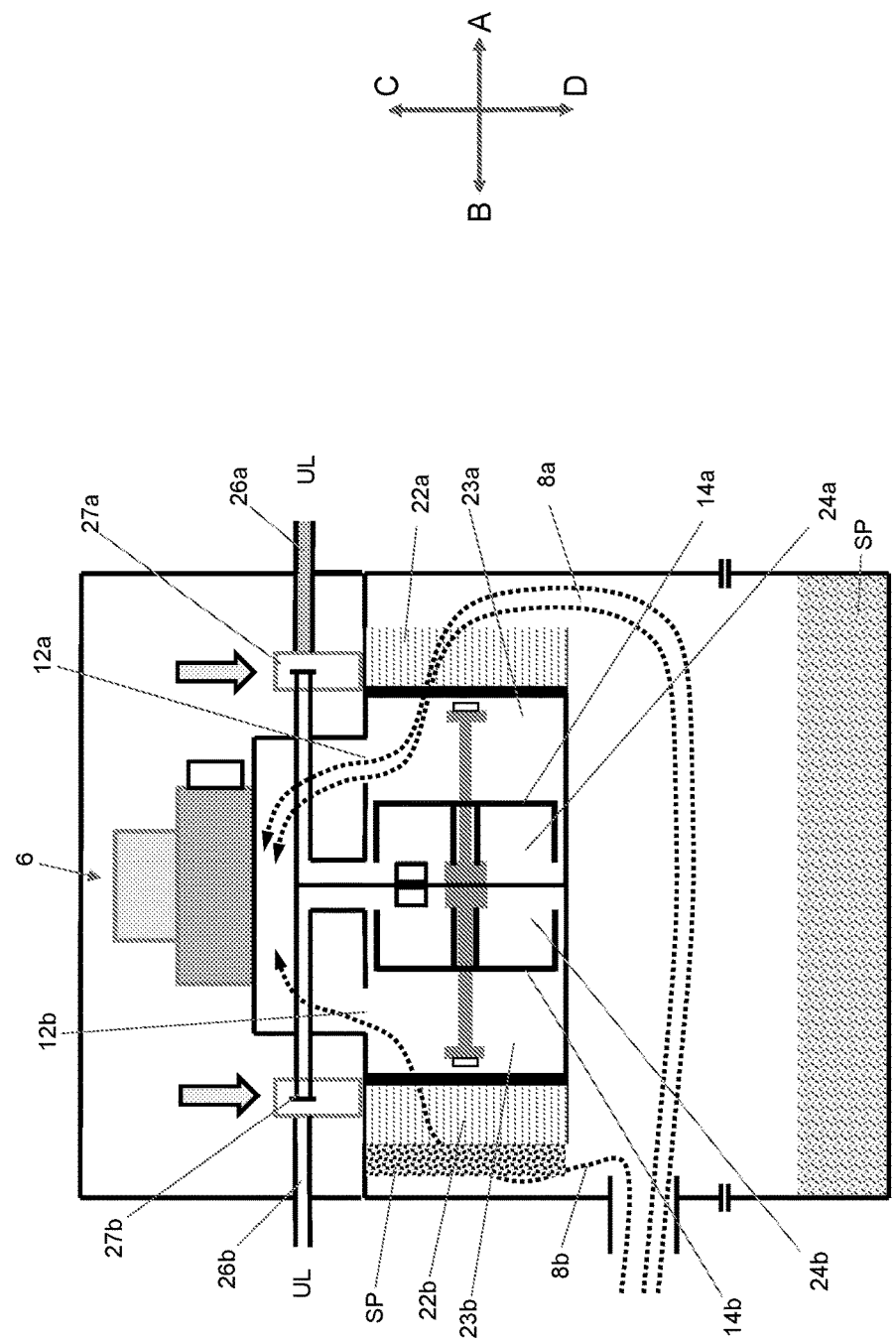
FIG. 7 shows a further schematic side view of the vacuum cleaner including the filter device according to the present invention, according to the first specific embodiment, the first and second valves being closed, and both the first and the second pressure surge element being in the first position.
Figure 8:
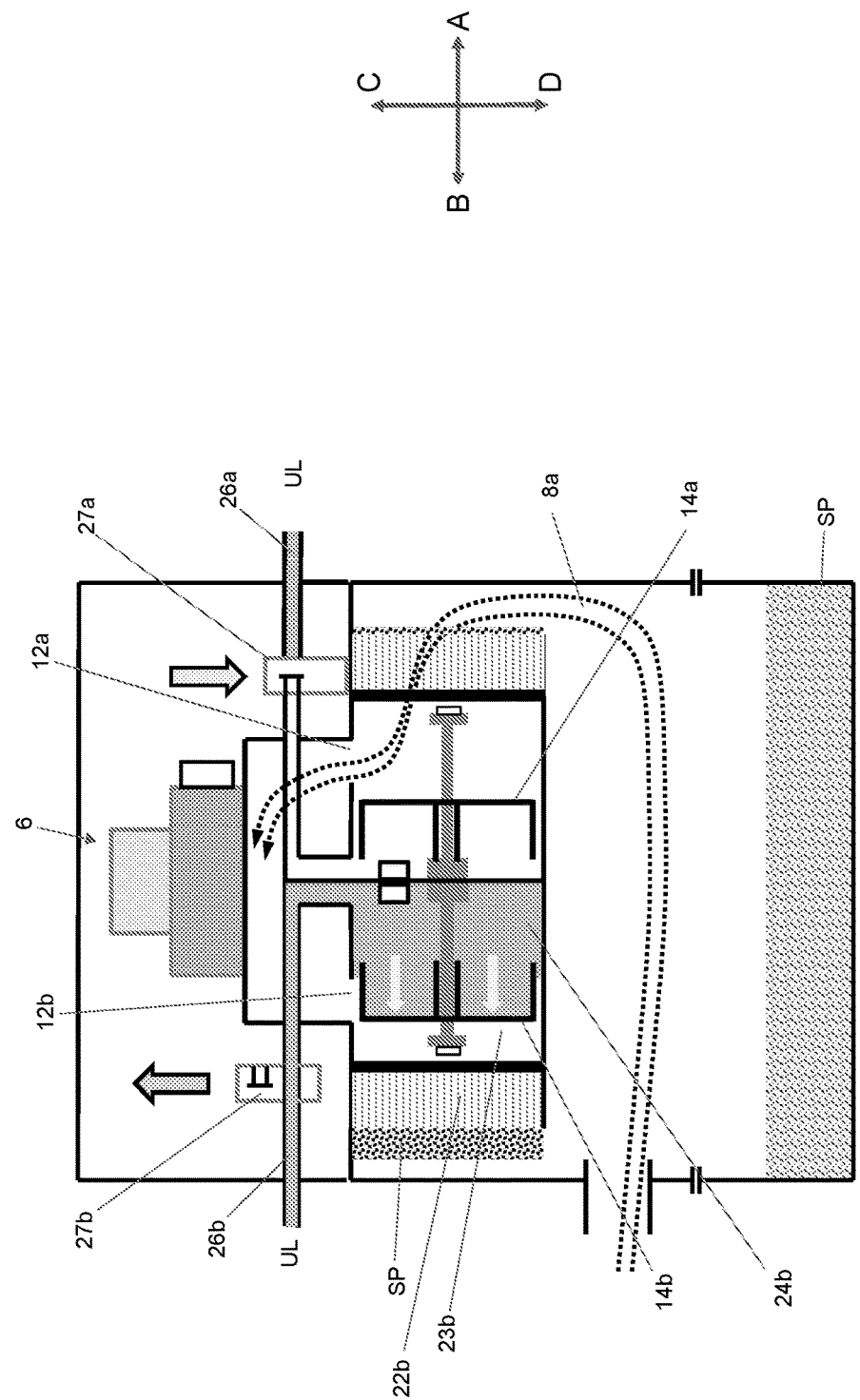
FIG. 8 shows a further schematic side view of the vacuum cleaner including the filter device according to the present invention, according to the first specific embodiment, the second valve being open, and the second pressure surge element being between the first and second positions.

FIG. 7 represents the state in which first filter element 22a is cleaned, but a certain dirt particle layer SP has accumulated on second filter element 22b by the suctioned dirt particles SP retained in second filter element 22b. As is also apparent from FIG. 7, second main air flow 8b is weaker compared to first main air flow 8a. Second main air flow 8b is weaker since less air is able to flow through the clogged second filter element 22b into first space 23b of second chamber 11b. The air pressure value is measured with the aid of first air pressure sensor 28a in first space 23a of second chamber 11b and transmitted to control unit 7. Control unit 7 establishes the low air pressure value in first space 23b and opens second valve 27b, so that ambient air UL having an atmospheric pressure is able to flow via second inlet line 26b and through second inlet opening 25b into second space 24b of second chamber 11b. As a result of the sudden overpressure in second space 24b of second chamber 11b, second pressure surge element 14b is moved instantaneously from the first position in direction B into the second position (FIG. 8). As was already described for first pressure surge element 14b, second pressure surge element 14b designed as a piston increasingly closes second outflow opening 12b in the path from the first into the second position. In this way, the pressure difference between first and second spaces 23b, 24b continues to increase.

The instantaneous movement of second pressure surge element 14b from the first into the second position causes a pulse to be transmitted from second pressure surge element 14b onto second filter element 22b via the accumulated air in the gap (i.e., small first space) between second pressure surge element 14b and second filter element 22b. As a result of this pulse, dirt particle layer SP is detached from or knocked off second filter element 22b. Dirt particle layer SP falls in direction D into collection container 4 (cf. FIG. 9). In this state, vacuum cleaner 1 continues to remain in a vacuuming mode since it is possible to continue to suction dirt particles SP through first filter element 22a and first chamber 11a with first main air flow 8a (cf. FIGS. 8, 9).

Afterwards, second valve 27b in second inlet line 26b is closed via control unit 7, so that overpressure is no longer present in second space 24b. Second main air flow 8b presses on second pressure surge element 14b designed as a piston and moves it from the second position in direction A back into the first position again. Second outflow opening 12b is now no longer closed, and second main air flow 8b again flows through second filter element 22b and through second chamber 11b.

As is shown in FIG. 12, the procedure of cleaning first filter element 22a is repeated when it is covered again with a dirt particle layer SP after a certain time, i.e., filter element 22a is clogged with dirt particles SP.

The cleaning of filter elements 22a, 22b may be carried out based on the air pressure values which are measured by first air pressure sensors 28a, 28b and transmitted to control unit 7. As described above, cleaning of a filter element 22a, 22b may take place when the measured air pressure value in first space 23a, 23b exceeds a particular value. However, it is also possible for the cleaning of filter elements 22a, 22b to be controlled by control unit 7 on a regular basis or at particular intervals. As an alternative, the cleaning of filter elements 22a, 22b may also take place by a user of vacuum cleaner 1 with the aid of a mechanism not shown in the figures. It is possible that the mechanism is able to alternately close and reopen first or second valve 27a, 27b, so that first and second filter elements 22a, 22b are also alternately cleaned.

Figure 13:
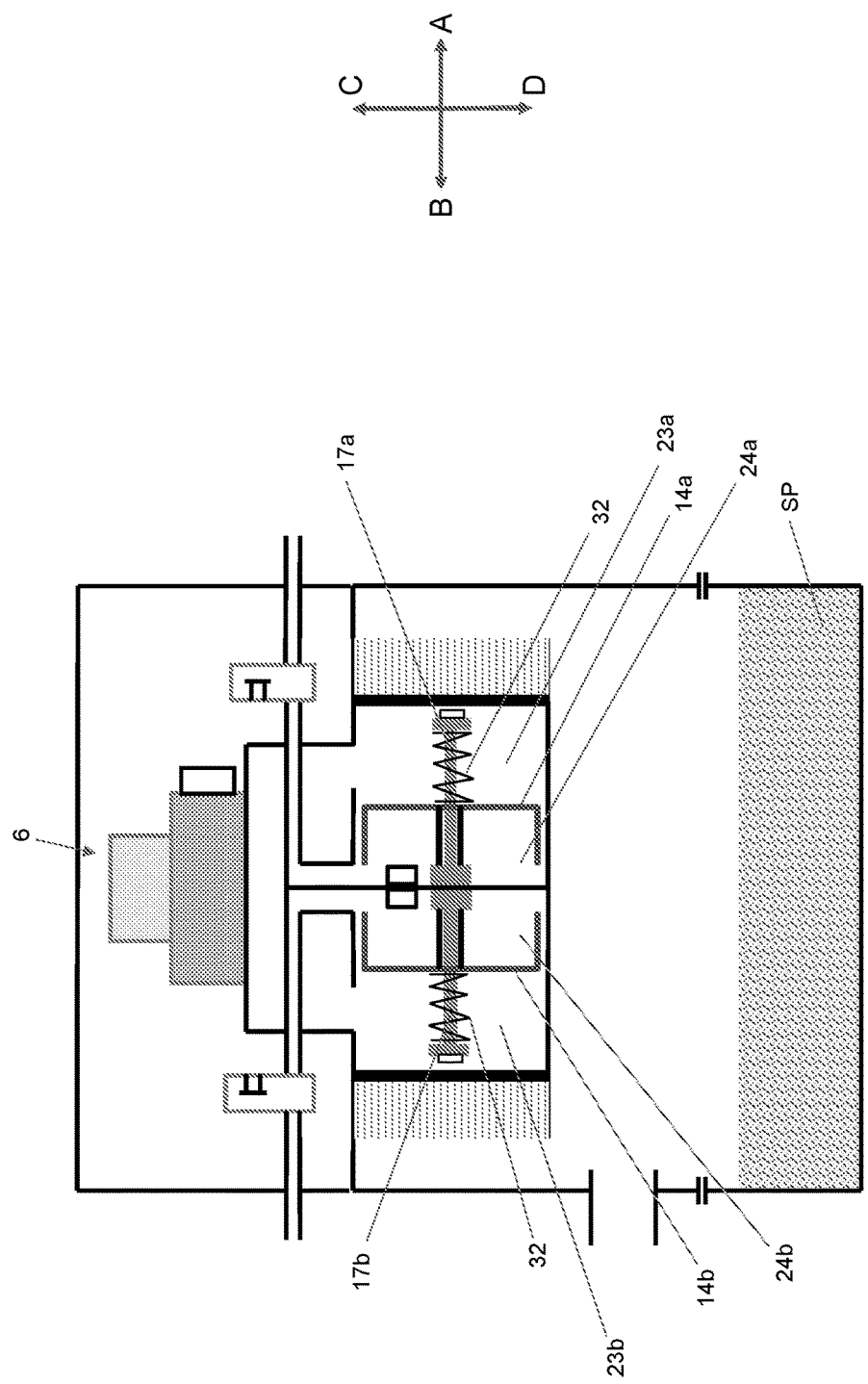
FIG. 13 shows a further schematic side view of the vacuum cleaner including the filter device according to the present invention, according to a second specific embodiment.

FIG. 13 shows a filter device 2 according to a second specific embodiment. Filter device 2 according to the second specific embodiment essentially corresponds to filter device 2 according to the first specific embodiment. In contrast to the first specific embodiment, filter device 2 according to the second specific embodiment includes a first retaining element 32 in the form of a compression spring. The compression spring is positioned in each case in first space 23a, 23b and around guide rod 17a, 17b. The compression spring includes a first and a second end, the first end resting against first end 20a, 20b of guide rod 17a, 17b, and the second end resting against pressure surge element 14a, 14b designed as a piston. Retaining element 32 designed as a compression spring is used to hold pressure surge element 14a, 14b in the first position until a certain air pressure value is achieved in first space 23a, 23b by the inflowing ambient air UL. When the air pressure finally exceeds the spring force of retaining element 32 designed as a compression spring, pressure surge element 14a, 14b moves, in particular, instantaneously from the first into the second position. In this way, improved cleaning of filter element 22a, 22b may be achieved.

Figure 14:
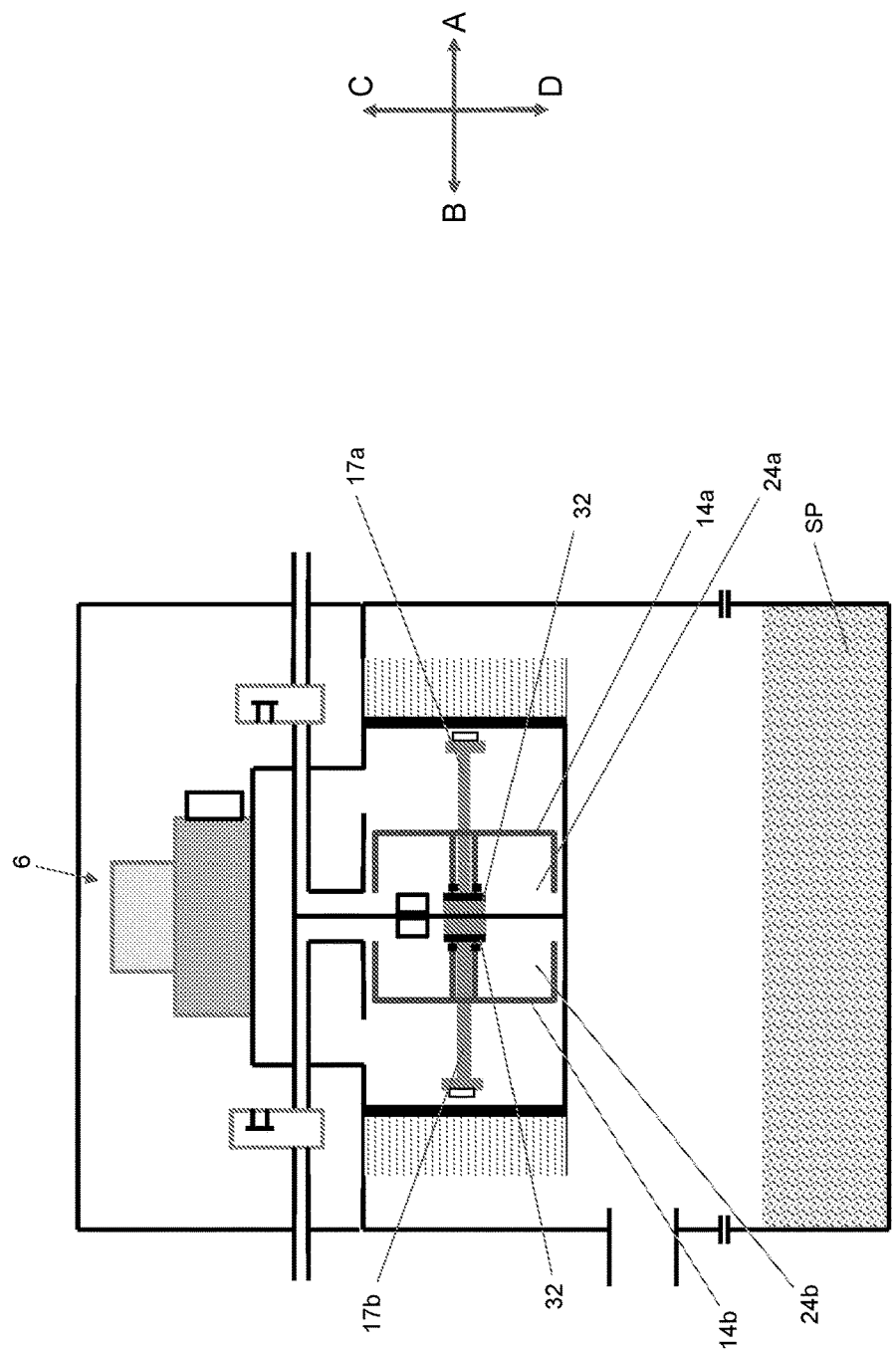
FIG. 14 shows a further schematic side view of the vacuum cleaner including the filter device according to the present invention, according to a third specific embodiment.

FIG. 14 shows a filter device 2 according to a third specific embodiment. Filter device 22a, 22b according to the second specific embodiment essentially corresponds to filter device 2 according to the first specific embodiment. In contrast to the first specific embodiment, filter device 2 according to the second specific embodiment includes a second retaining element 33 in the form of a magnet. The magnet is positioned in second space 24a, 24b and on second end 21a, 21b of guide rod 17a, 17b. The magnet acts on pressure surge element 14a, 14b designed as a piston in such a way that it is held in the first position until the air pressure rising as a result of the inflowing ambient air UL in second space 24a, 24b exceeds a certain value. When the air pressure in second space 24a, 24b finally exceeds the magnetic force of the magnet, pressure surge element 14a, 14b moves, in particular, instantaneously from the first into the second position. In this way, improved cleaning of filter element 22a, 22b may be achieved.

Figure 15:
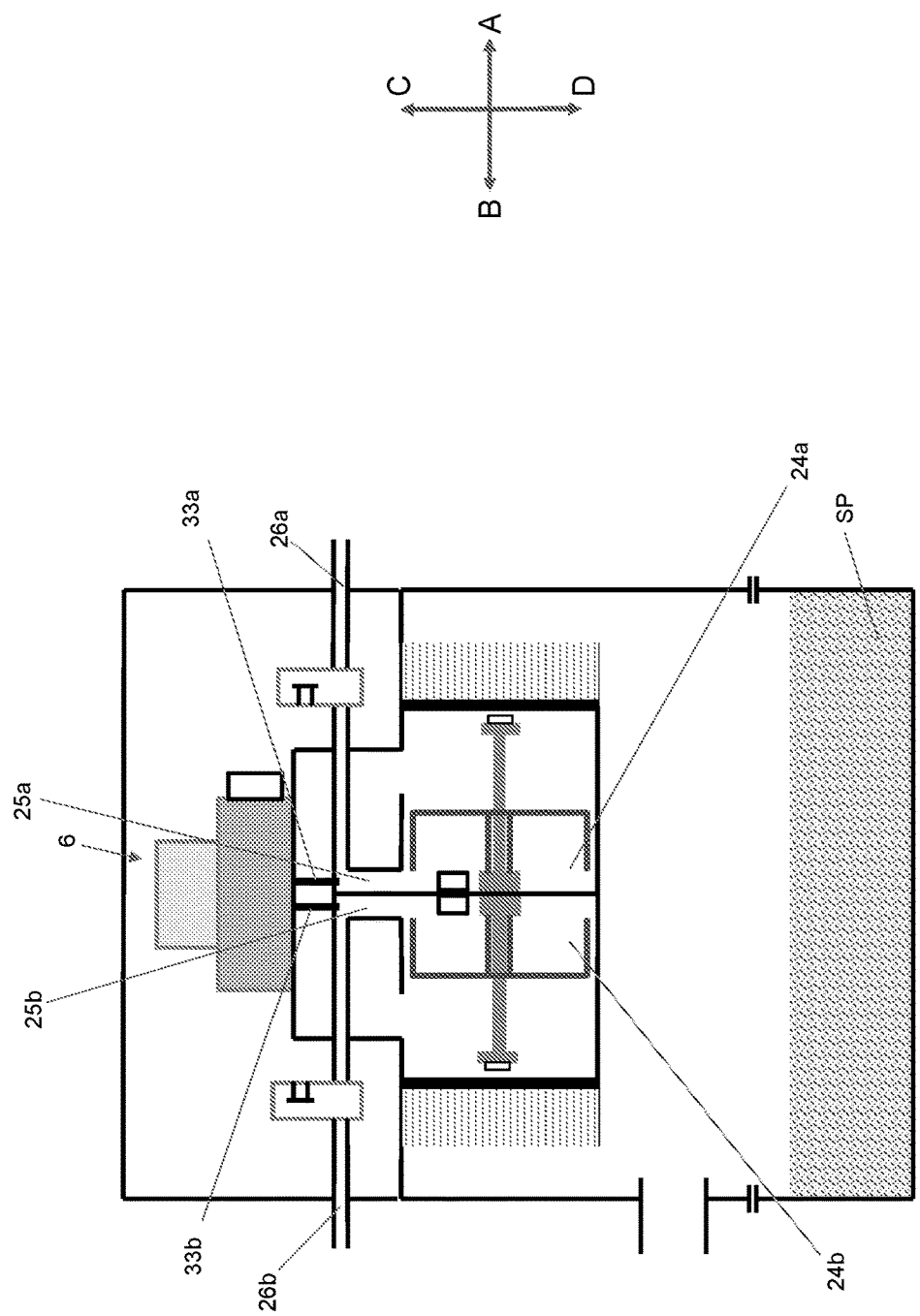
FIG. 15 shows a further schematic side view of the vacuum cleaner including the filter device according to the present invention, according to a fourth specific embodiment.

FIG. 15 shows a filter device 2 according to a fourth specific embodiment. Filter device 2 according to the fourth specific embodiment essentially corresponds to filter device 2 according to the first specific embodiment. In contrast to the first specific embodiment, filter device 2 according to the fourth specific embodiment includes a first and a second connecting channel 33a, 33b. First connecting channel 33a connects turbine device 6 and first inlet line 26a to increase the air pressure in second space 24a of first chamber 11a with the aid of turbine device 6. Second connecting channel 33b connects turbine device 6 and second inlet line 26b to increase the air pressure in second space 14b of second chamber 11b with the aid of turbine device 6. Since air is additionally able to flow via first or second connecting channel 33a, 33b out of second space 24a, 24b of the respective first or second chamber 11a, 11b with the aid of a negative pressure generated by turbine device 6, it is possible to move pressure surge element 14a, 14b from the second into the first position. In this way, pressure surge element 14a, 14b may be moved more quickly from the second into the first position.

Figure 16:
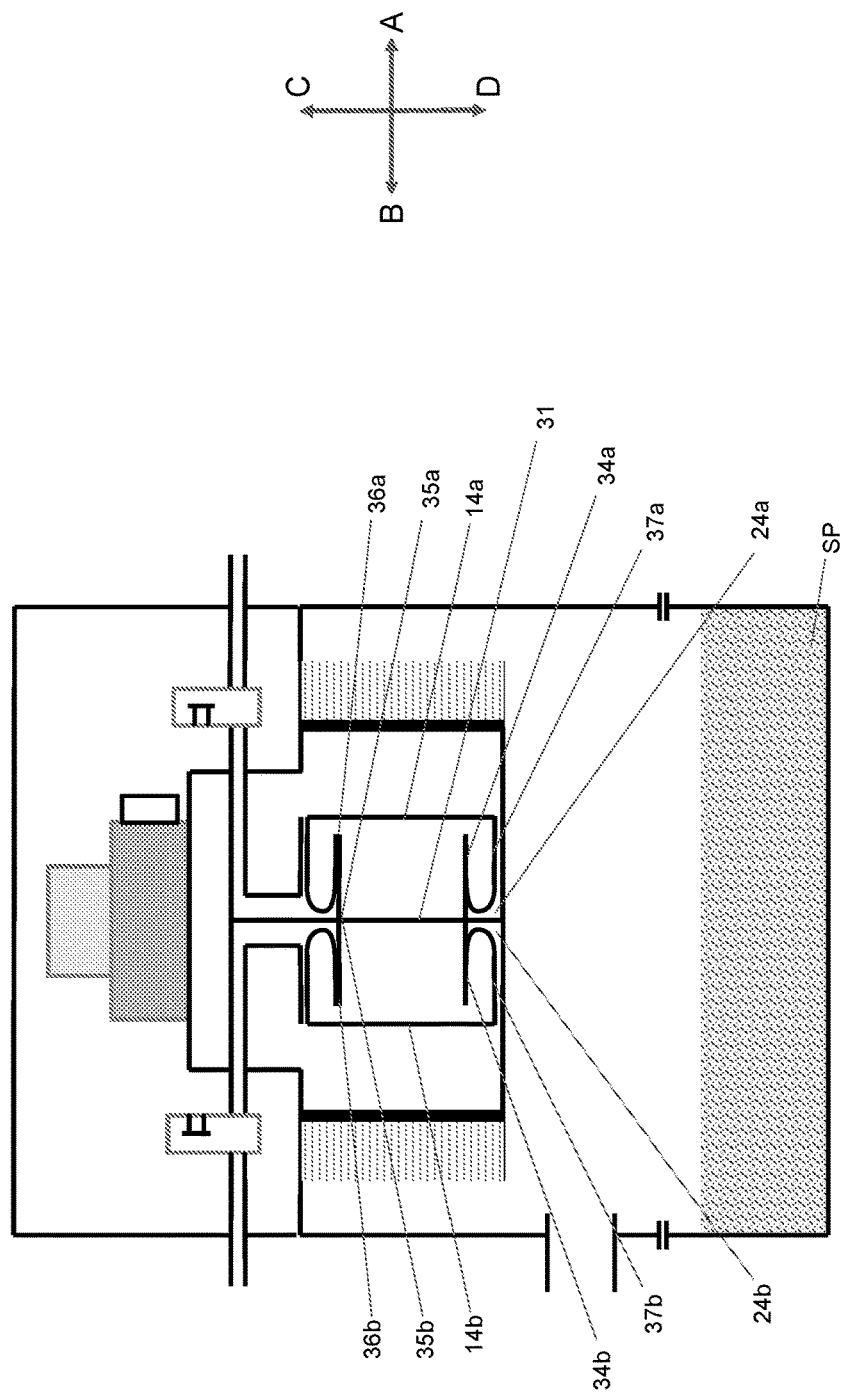
FIG. 16 shows a schematic side view of the vacuum cleaner including the filter device according to the present invention, according to a fifth specific embodiment.
Figure 17:
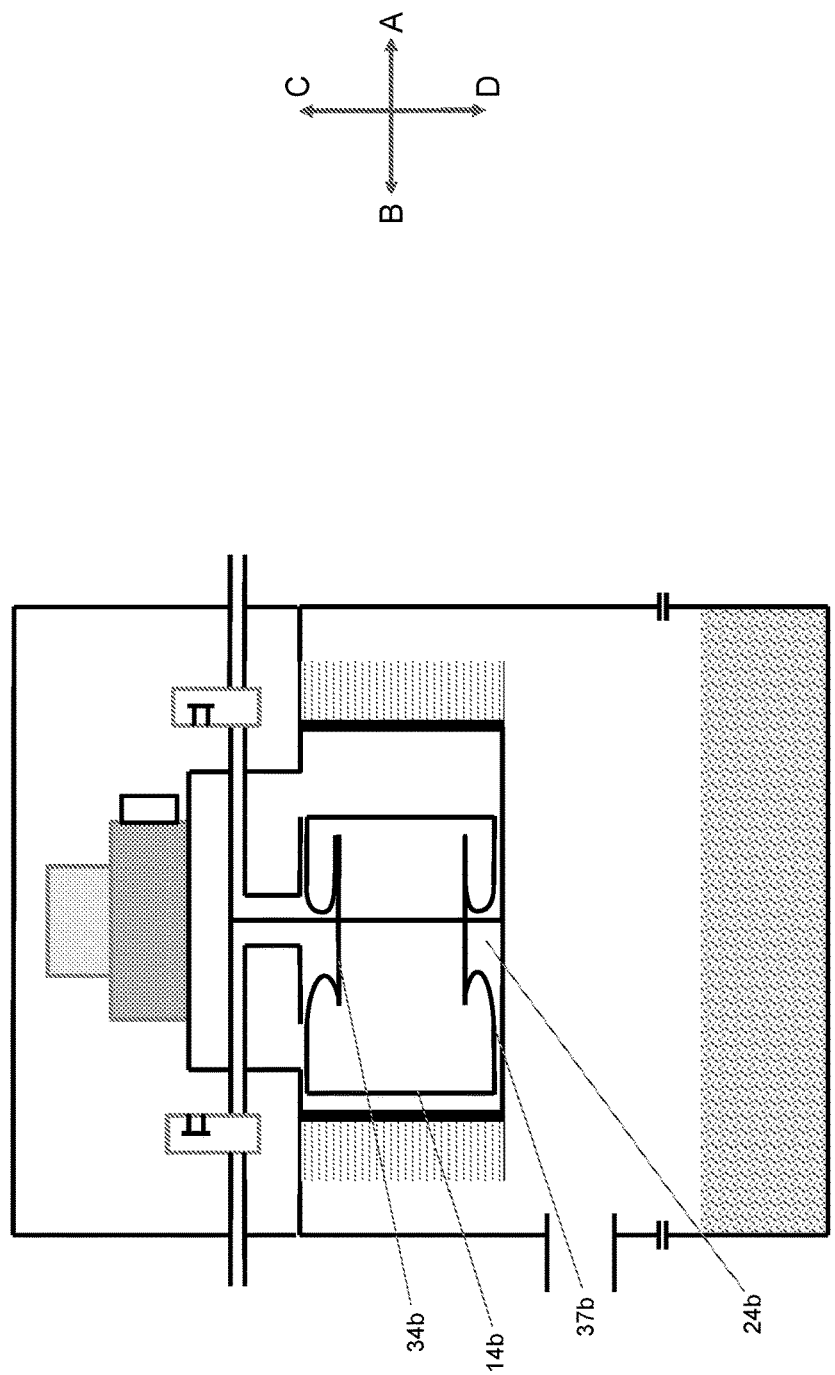
FIG. 17 shows a further schematic side view of the vacuum cleaner including the filter device according to the present invention, according to the fifth specific embodiment.

FIGS. 16 and 17 show a filter device 2 according to a fifth specific embodiment. In contrast to filter device 2 according to the other specific embodiments, i.e., first through fourth specific embodiments, first and second pressure surge elements 14a, 14b in filter device 2 according to the fifth specific embodiment are not equipped with a respective guide rod 17a, 17b. As is apparent from FIGS. 16 and 17, first and second pressure surge elements 14a, 14b are each designed in the form of a circular piston. A first cylinder element 34a is present in second space 24a of first chamber 11a. A second cylinder element 34b is present in second space 24b of second chamber 11b. Each cylinder element 34a, 34b includes a respective first end 35a, 35b and a second end 36a, 36b. First end 35a, 35b of cylinder elements 34a, 34b is attached to partition 31. A first diaphragm element 37a is positioned on second end 36a of first cylinder element 34a. First diaphragm element 37a completely encloses second end 36a of first cylinder element 34a and connects second end 36a of first cylinder element 34a to the outer edge of pressure surge element 14a, 14b designed as a circular piston or as a disk. A second diaphragm element 37b is positioned on second end 36b of second cylinder element 34b. Second diaphragm element 37b completely encloses second end 36b of second cylinder element 34b and connects second end 36b of second cylinder element 34b to the outer edge of the pressure surge element designed as a circular piston or as a disk. First and second diaphragm elements 37a, 37b are each designed as a rolling diaphragm, so that it extends elastically with first or second pressure surge element 14a, 14b when first or second pressure surge element 14a, 14b moves from the first into a second position (cf. FIG. 17). In other words, first and second diaphragm elements 37a, 37b designed as a rolling diaphragm each roll out when the respective pressure surge element 14a, 14b moves from the first into the second position. When pressure surge element 14a, 14b moves from the second back into the first position, first and second diaphragm elements 37a, 37b designed as a rolling diaphragm each roll up again.

According to one further specific embodiment not shown in the figures, it is furthermore also possible for the second, third and fourth specific embodiments to be combined with one another.

What is claimed is:

1. A filter device for a vacuum cleaner having a turbine device for generating at least one first and one second main air flow through at least a portion of the vacuum cleaner having and a control unit, the filter device comprising:
 a first chamber including a first filter element, a first outflow opening, a first inlet opening and a first pressure surge element dividing the first chamber into a first chamber first space and a first chamber second space and reversibly movable between a first pressure surge element first position and a first pressure surge element second position;
 a second chamber including a second filter element, a second outflow opening, a second inlet opening and a second pressure surge element dividing the second chamber into a second chamber first space and a second chamber second space reversibly movable between a second pressure surge element first position and a second pressure surge element second position and
 a first inlet line including a first valve and a second inlet line including a second valve, the first inlet opening being connectable to the ambient air by the first inlet line, and the second inlet opening being connectable to the ambient air by the second inlet line, and the first inlet line being closeable by the first valve and the second inlet line being closeable by the second valve.

2. The filter device as recited in claim 1 wherein the alternating reversible movement of the first pressure surge element from the first pressure surge element first position into the first pressure surge element second position and the second pressure surge element from the second pressure surge element first position into the second pressure surge element second position is regulated by the control unit.

3. The filter device as recited in claim 1 further comprising a first and a second retaining element, the first retaining element being able to hold the first pressure surge element in the first pressure surge element first position, and the second retaining element being able to hold the second pressure surge element in the second purge element first position.

4. The filter device as recited in claim 3 wherein the first or second retaining element is designed in the form of a spring.

5. The filter device as recited in claim 3 wherein the first or second retaining element is designed in the form of a magnet.

6. The filter device as recited in claim 1 further comprising a first and a second connecting channel, the first connecting channel connecting the turbine device and the first inlet line to increase the air pressure in the second space of the first chamber with the aid of the turbine device, and the second connecting channel connecting the turbine device and the second inlet line to increase the air pressure in the second space of the second chamber with the aid of the turbine device.

7. The filter device as recited in claim 1 wherein the at least one first main air flow is able to flow into the first chamber first space through the first filter element and to flow back out through the first outflow opening.

8. The filter device as recited in claim 1 wherein the at least one second main air flow is able to flow into the second chamber first space through the second filter element and to flow back out through the second outflow opening.

9. The filter device as recited in claim 1 wherein the first outflow opening and the first filter element are positioned in the first chamber first space in such a way that a negative pressure generatable by the at least one first main air flow moves the first pressure surge element into the first pressure surge element first position, and the at least one second outflow opening and the second filter element are positioned in the second chamber first space in such a way that a negative pressure generatable by the at least one second main air flow moves the second pressure surge element into the second pressure surge element first position.

10. The filter device as recited in claim 1 wherein the first inlet opening is positioned in the second space of the first chamber in such a way that atmospheric pressure acting on the first chamber second space through the first inlet opening moves the first pressure surge element into the first pressure surge element second position, whereby a pulse is transmitted from the first pressure surge element to the first filter element to instantaneously clean the first filter element, and the second inlet opening is positioned in the second chamber second space in such a way that the atmospheric pressure acting on the second chamber second space through the second inlet opening moves the second pressure surge element into the second position, whereby a further pulse is transmitted from the second pressure surge element to the second filter element to instantaneously clean the second filter element, the atmospheric pressure being created by air from surroundings of the vacuum cleaner.

11. The filter device as recited in claim 1 wherein the first pressure surge element and the second pressure surge element alternately are reversibly movable from the first into the second position to alternately clean the first and second filter elements.

* * * * *